(12) United States Patent
Pullela et al.

(10) Patent No.: US 9,882,679 B2
(45) Date of Patent: Jan. 30, 2018

(54) METHOD AND SYSTEM FOR IMPROVED CROSS POLARIZATION REJECTION AND TOLERATING COUPLING BETWEEN SATELLITE SIGNALS

(71) Applicants: Raja Pullela, Irvine, CA (US); Glenn Chang, Carlsbad, CA (US); Timothy Gallagher, Encinitas, CA (US)

(72) Inventors: Raja Pullela, Irvine, CA (US); Glenn Chang, Carlsbad, CA (US); Timothy Gallagher, Encinitas, CA (US)

(73) Assignee: Maxlinear, Inc., Carlsbad, CA (US)

( * ) Notice: Subject to any disclaimer, the term of this patent is extended or adjusted under 35 U.S.C. 154(b) by 380 days.

(21) Appl. No.: 13/933,865

(22) Filed: Jul. 2, 2013

(65) Prior Publication Data
US 2014/0003559 A1    Jan. 2, 2014

Related U.S. Application Data

(60) Provisional application No. 61/667,373, filed on Jul. 2, 2012.

(51) Int. Cl.
H04B 1/10   (2006.01)
H04L 1/00   (2006.01)
H04H 40/90  (2008.01)

(52) U.S. Cl.
CPC ......... H04L 1/0091 (2013.01); H04H 40/90 (2013.01)

(58) Field of Classification Search
CPC .............................. H04B 1/7097; H04B 3/32
(Continued)

(56) References Cited

U.S. PATENT DOCUMENTS 5,905,574 A   5/1999  Vollbrecht
8,199,851 B1  5/2012  Dybdal
(Continued)

OTHER PUBLICATIONS

PCT, International Search Report and the Written Opinion of the International Searching Authority, in International No. PCT/US2013/049172, dated Sep. 30, 2013. (11 pages).
(Continued)

Primary Examiner — Kevin M Burd
(74) Attorney, Agent, or Firm — McAndrews, Held & Malloy

(57) ABSTRACT

Methods and systems for improved cross polarization rejection and tolerating of coupling between satellite signals may comprise receiving radio frequency (RF) signals on a chip, where the RF signals comprising a desired signal and at least one crosstalk signal. The received RF signals may be down-converted to baseband frequencies, and the down-converted signals are converted to digital signals. Crosstalk may be determined by estimating complex coupling coefficients between the received RF signals utilizing a de-correlation algorithm across a frequency bandwidth comprising the desired and crosstalk signals. The down-converted signals may be low-pass filtered and summed with an output signal from a cancellation filter. The complex coupling coefficients may be determined utilizing the de-correlation algorithm on the summed signals, and may be used to configure the cancellation filter. Crosstalk may be canceled in a receiver path from a cancellation filter receiving low-pass filtered down-converted signals from another path.

30 Claims, 5 Drawing Sheets

(58) Field of Classification Search
USPC .................................. 375/316, 343, 346, 350
See application file for complete search history.

(56) References Cited

U.S. PATENT DOCUMENTS

| | | | |
|---|---|---|---|
| 8,615,055 B2* | 12/2013 | Milotta et al. ................. | 375/324 |
| 2004/0132414 A1* | 7/2004 | Sendyk et al. .................. | 455/73 |
| 2005/0240642 A1* | 10/2005 | Parra ................... | G06K 9/6243 |
| | | | 708/400 |
| 2009/0060067 A1* | 3/2009 | Guenach .................. | H04B 3/32 |
| | | | 375/260 |
| 2010/0309774 A1 | 12/2010 | Astrom | |
| 2011/0099007 A1 | 4/2011 | Zhang | |
| 2011/0110409 A1* | 5/2011 | Sands .................... | H04B 3/487 |
| | | | 375/222 |
| 2012/0128166 A1 | 5/2012 | Kim | |

OTHER PUBLICATIONS

Guo, Advanced MIMO-CDMA Receiver for Interface Suppression; Algorithms, System-on-Chip Architectures and Design Methodology, Rice University. May 2005. [Retrieved on Sep. 1, 2013]. Retrieved from the internet <URL:http://citeseerx.ist.psu.edu/viewdock/download?doI=10.1.1.91.6926&rep=rep1&type=pdf>, entire document. (293 pages).

International Preliminary Report on Patentability corresponding to International Patent Application No. PCT/US2013/049172, dated Jan. 6, 2015.

* cited by examiner

METHOD AND SYSTEM FOR IMPROVED CROSS POLARIZATION REJECTION AND TOLERATING COUPLING BETWEEN SATELLITE SIGNALS

CROSS-REFERENCE TO RELATED APPLICATIONS/INCORPORATION BY REFERENCE

This application makes reference to and claims priority to U.S. Provisional Application Ser. No. 61/667,373 filed on Jul. 2, 2012. The above identified application is hereby incorporated herein by reference in its entirety.

FIELD OF THE INVENTION

Certain embodiments of the invention relate to wireless communication. More specifically, certain embodiments of the invention relate to a method and system for improved cross polarization rejection and tolerating coupling between satellite signals.

BACKGROUND OF THE INVENTION

Satellite television has advanced from an expensive hobbyist-only technology to a ubiquitous residential television service that rivals cable television, primarily due to reductions in the cost of satellite television reception technology.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for improved cross polarization rejection and tolerating coupling between satellite signals substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for improved cross polarization rejection and tolerating of coupling between satellite signals. Exemplary aspects of the invention may comprise receiving radio frequency (RF) signals on a chip, the RF signals comprising a desired signal and at least one crosstalk signal, down-converting the received RF signals to baseband frequencies, converting the down-converted signals to digital signals, determining crosstalk by estimating complex coupling coefficients between the received RF signals utilizing a de-correlation algorithm across a frequency bandwidth comprising the desired and crosstalk signals, and extracting data communicated by the desired signal by minimizing the complex coupling coefficients. The de-correlation algorithm may comprise a blind source separation algorithm. The crosstalk may be approximated as linear within the frequency bandwidth. The crosstalk signal may comprise one or both of satellite polarization crosstalk and signal bleeding between RF paths in the chip. The down-converted signals may be low-pass filtered and summed with an output signal from a cancellation filter. The complex coupling coefficients may be determined utilizing the de-correlation algorithm on the summed signals and the cancellation filter may be configured utilizing the determined complex coupling coefficients. Crosstalk may be canceled in a first receiver path on the chip from a cancellation filter that receives low-pass filtered down-converted signals from a second receiver path on the chip. Crosstalk may be canceled in the second receiver path on the chip from a cancellation filter that receives low-pass filtered down-converted signals from the first receiver path on the chip As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be implemented in hardware, software, firmware, or any combination of one or more thereof. As utilized herein, the term "exemplary" means serving as a non-limiting example, instance, or illustration. As utilized herein, the term "e.g.," introduces a list of one or more non-limiting examples, instances, or illustrations.

Figure 1:
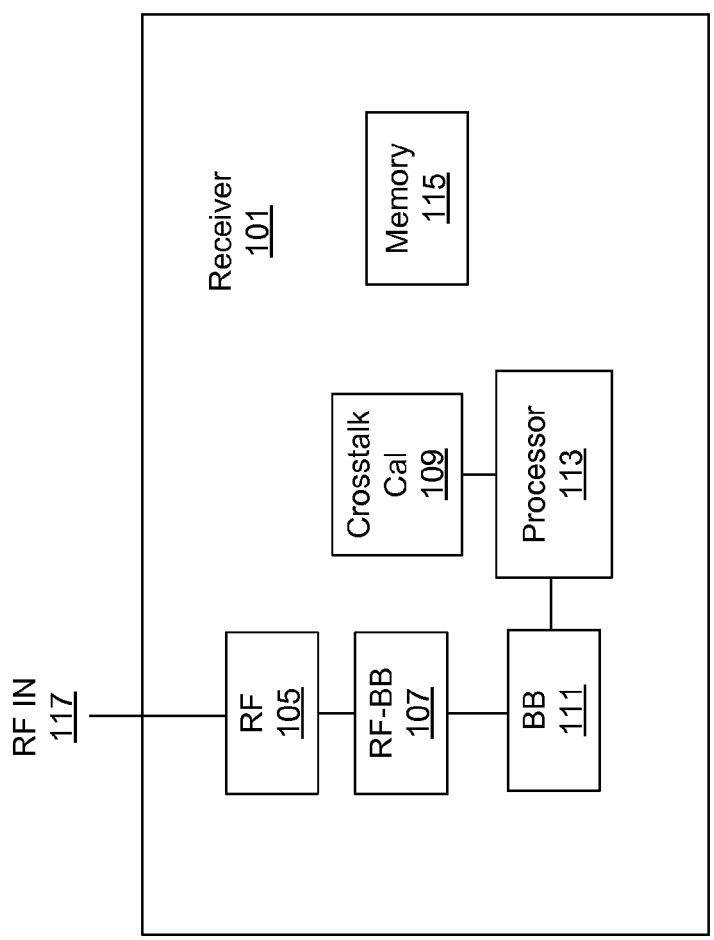
FIG. 1 is a diagram of an exemplary communication device with crosstalk calibration and compensation, in accordance with an embodiment of the invention.

FIG. 1 is a diagram of an exemplary communication device with crosstalk calibration and compensation, in accordance with an embodiment of the invention. Referring to FIG. 1, there is shown a receiver 101 comprising a radio frequency (RF) module 105, an RF-to-baseband conversion module 107, a crosstalk calibration and compensation module 109, a baseband module 111, a processor 113, and a memory 115.

The receiver 101 may be utilized for receiving satellite television signals, cable television signals, or any RF signal carrying multiple channels of data desired by a user. In an example scenario, the receiver 101 may comprise a set-top box. In this example, the receiver 101 may be operable to receive satellite, cable, or terrestrial television signals, down-convert and process the signals for communication to a display device, such as a television, for example.

The RF module 105 may comprise one or more RF receive (Rx) and transmit (Tx) paths for receiving signals from a satellite system, cable TV head-end, and/or terrestrial TV antennas, for example. The RF module 105 may comprise impedance matching elements, LNAs, power amplifiers, variable gain amplifiers, and filters, for example. The RF module 105 may thus be operable to receive, amplify, and filter RF signals before communicating them to the RF-to-baseband module 107.

The RF-to-baseband module 107 may comprise mixers and local oscillators that may be operable to receive RF signals and down-convert them to baseband signals for further processing by the baseband module 111. The RF-to-baseband module 107 may comprise in-phase and quadrature mixers for use with polar signals, for example. The RF module 105 and the RF-to-baseband module 107 may comprise a wide bandwidth such that multiple channels may be received and down-converted to baseband. A wide bandwidth of received signals may enable cross talk reduction through a de-correlation process, for example.

The crosstalk calibration and compensation module 109 may comprise circuitry operable to de-correlate crosstalk signals between RF paths in the RF module 105 and the RF-to-baseband module 107 or from externally generated crosstalk. For example, satellite television waveguide splitters may bleed horizontally polarized signals into the selected vertically polarized signals, and vice-versa. Similarly, high frequency signals in one RF path in a chip or package may couple to other RF paths on the chip or package, or signals from different satellites may be received concurrently. Also, rain in the atmosphere may cause polarization crosstalk. Accordingly, the crosstalk calibration and compensation module 109 may comprise configurable frequency conversion capability, configurable filters, and signal coupling coefficient estimation circuitry, for example.

The baseband module 111 may comprise circuitry operable to process received baseband signals. For example, the baseband module 111 may comprise filters and amplifiers for further processing of the selected baseband signals. In addition, the baseband module 111 may comprise one or more analog-to-digital converters (ADCs) to convert the received analog signals to digital signals for processing by the processor 113.

The processor 113 may comprise a general purpose processor, such as a reduced instruction set computing (RISC) processor, for example, that may be operable to control the functions of the receiver 101. For example, the processor 113 may configure the RF-to-baseband module 107 to compensate for and eliminate undesired crosstalk signals based on de-correlation algorithms performed by the crosstalk calibration and compensation module 109. Additionally, the processor 113 may demodulate baseband signals received from the baseband module 111.

The memory 115 may comprise a programmable memory module that may be operable to store software and data, for example, for the operation of the receiver 101. Furthermore, the memory 115 may store the de-correlation algorithm results from the crosstalk calibration and compensation module 109.

Receivers introduce undesirable impairments to a signal when the signal is being amplified, filtered or downconverted. For example, direct conversion receivers, which may also be referred to as "DCR", "zero IF receivers", or "ZIF receivers", are a very efficient way of implementing a radio receiver. However, they introduce a variety of impairments to a signal which can degrade overall performance of the system.

In an exemplary embodiment, signal crosstalk may be calibrated and compensated for in the receiver 101 utilizing de-correlation algorithms, such as blind source separation (BSS) algorithms, on received signals. Three favorable conditions for this crosstalk reduction are (1) a full spectrum capture architecture, i.e., if it is desired to use the signals to cancel each other, both signals are captured; (2) the two signals are on the same chip so that a large amount of information does not have to be passed between chips; and (3) the ability to run the de-correlation algorithm (blind source separation being one example).

The de-correlation may operate on narrow band slices of the entire frequency band or may operate on the entire wide band frequency range. The gain and phase coefficients may then be determined for each signal to subtract the undesired signal in the digital domain. In general, the crosstalk between channels may be frequency-dependent. If the desired channel is narrow, the crosstalk may be approximated as linear within the frequency bandwidth, i.e., the coupling coefficients may be approximated as a linear function of frequency.

Figure 2:
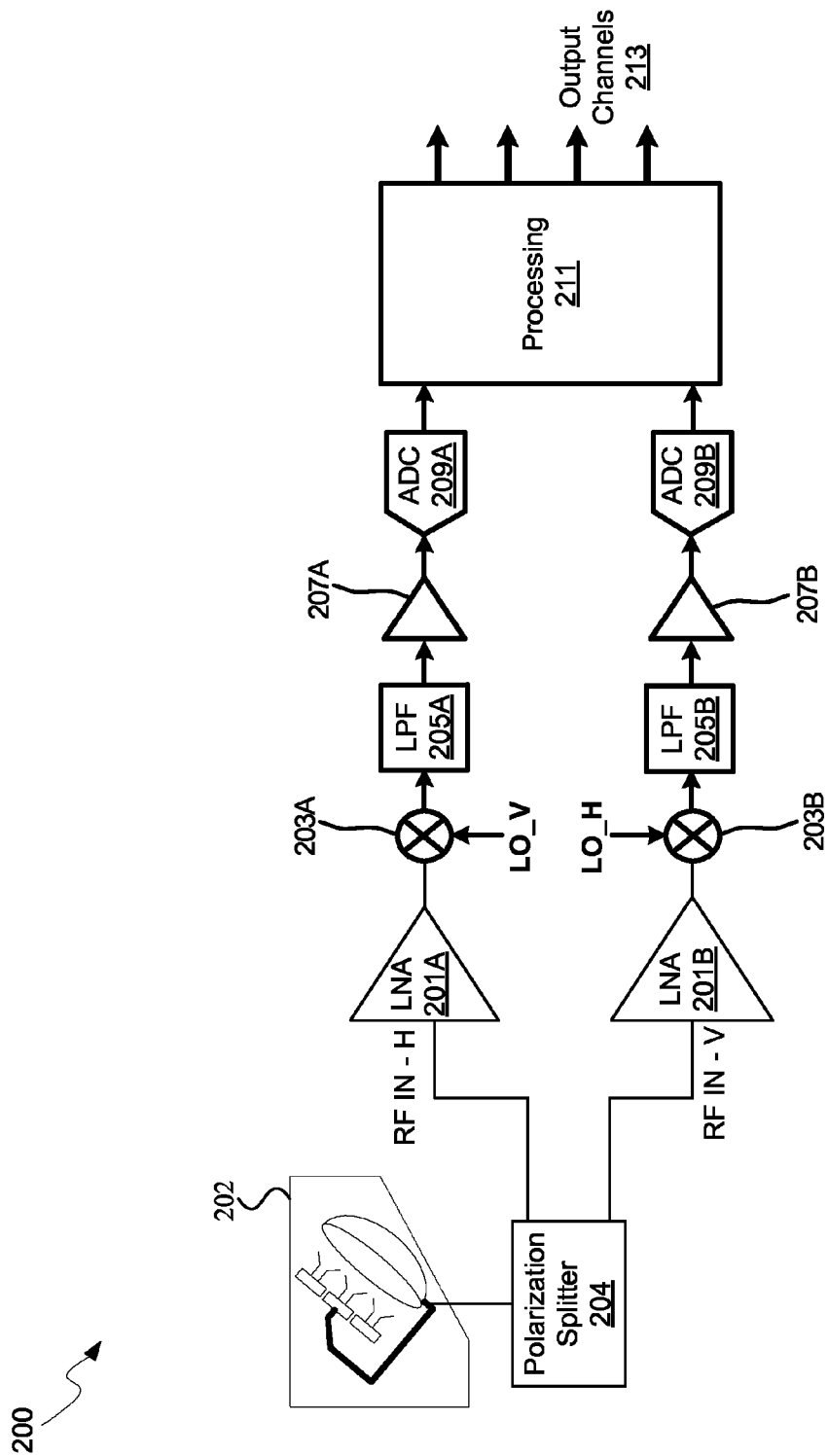
FIG. 2 is a diagram illustrating an exemplary satellite receiver with crosstalk calibration and compensation, in accordance with an embodiment of the invention.

FIG. 2 is a diagram illustrating an exemplary receiver with crosstalk calibration and compensation, in accordance with an embodiment of the invention. Referring to FIG. 2, there is shown a receiver 200 comprising separate RF paths for horizontal and vertically (or left and right) polarized satellite signals, a satellite dish receiver 202, a polarization splitter 204, and a processing module 211. In another exemplary scenario, the receiver 200 may comprise a single RF path. There is also shown input RF signals RF IN-H and RF IN-V, and output channels 213. It should be noted that the invention is not necessarily limited to vertical/horizontal crosstalk in a satellite television, but is merely shown as an example of crosstalk compensation and calibration.

The satellite dish receiver 202 may comprise a singular horn or may comprise a plurality of horns coupled to a single dish. In the latter case, the single dish may receive signals from multiple orbital positions, with signals from different horns and polarizations as possible sources of signal crosstalk.

The RF paths may comprise low noise amplifiers (LNAs) 201A and 201B, mixers 203A and 203B, low-pass filters 205A and 205B, gain stages 207A and 207B, analog-to-digital converters (ADCs) 209A and 209B. There is also shown RF input signals, RF IN-H and RF IN-V, local oscillator signals LO_V and LO_H, and output channels 213. In an exemplary scenario, the number of RF paths may correspond to the number of horns on the satellite dish. For example, the receiver 200 may comprise six RF paths for three separate feeder horns each supplying horizontal and vertical, or left and right, polarizations.

The LNAs 201A and 201B may be operable to provide amplification to the signals RF IN-H and RF IN-V, respectively, with the amplified signals being communicated to the mixers 203A and 203B. In instances where the LNAs 201A and 201B are in close proximity on a chip, crosstalk may result with undesired signals being processed by the RF paths.

The mixers 203A and 203B may comprise circuitry that is operable to generate output signals at frequencies that are the sum and the difference between the input RF signal, RF IN-H and RF IN-V, and the local oscillator signal, which comprises either LO_H or LO_V, respectively. The frequency of LO_V or LO_H may be configured such that it is centered within the desired channels. The local oscillator signals LO_V or LO_H may be generated by voltage-controlled oscillators in a phase-locked loop, for example, where the frequency of oscillation may be configured by a control voltage.

The low-pass filters 205A and 205B may comprise circuitry that is operable to attenuate signals above a corner frequency and allow signals below the corner frequency to pass. In this manner, sum frequency signals from the mixers 203A and 203B may be filtered while difference frequency signals may be allowed to pass through to the gain modules 207A and 207B. In an example scenario, the low-pass filters 205A and 205B may have configurable cutoff frequencies and attenuation, and may be controlled by the processing module 211.

The gain modules 207A and 207B may comprise amplifiers for amplifying the down-converted and filtered signals. The gain modules 207A and 207B may comprise configurable gain levels, and may be controlled by the processing module 211, for example.

The ADCs 209A and 209B may comprise circuitry that is operable to convert analog input signals to digital output signals. Accordingly, the ADCs 209A and 209B may receive baseband analog signals from the gain modules 207A and 207B and may generate digital signals to be communicated to the processing module 211.

The processing module 211 may comprise a processor similar to the processor 113, for example, described with respect to FIG. 1. Accordingly, the processing module 213 may be operable to control the functions of the receiver 200 and may process received baseband signals to demodulate, and/or perform other processing techniques to the data. Furthermore, the processing module 211 may perform crosstalk calibration and compensation and/or control various components based on received crosstalk compensation data.

In an example scenario, the crosstalk calibration and compensation process performed by the processing module 211 may calibrate the receiver 200 without a calibration signal, and may calibrate crosstalk utilizing the signals being received by the system under normal operation. Furthermore, the calibration and compensation may be performed entirely in the digital domain, thereby inducing no overhead in the RF/analog domain.

To calibrate and compensate for signal crosstalk, the process may approximate the frequency dependency of the crosstalk over a channel bandwidth as linear. As such, the crosstalk may be represented as a sum of an average term and a linearly varying term, which makes the calibration process more tractable and leads to a more efficient implementation. Accordingly, the output channels 213 may comprise the desired data from the received RF signals, without crosstalk of data from undesired channels.

In an example scenario, the calibration process may be based on blind source separation (BSS) algorithms to estimate the crosstalk over a certain bandwidth, although any signal de-correlation algorithm may be used. The BSS method estimates the complex coupling coefficients between the two signals and the coupling coefficients may then be reduced in an iterative process.

Figure 3:
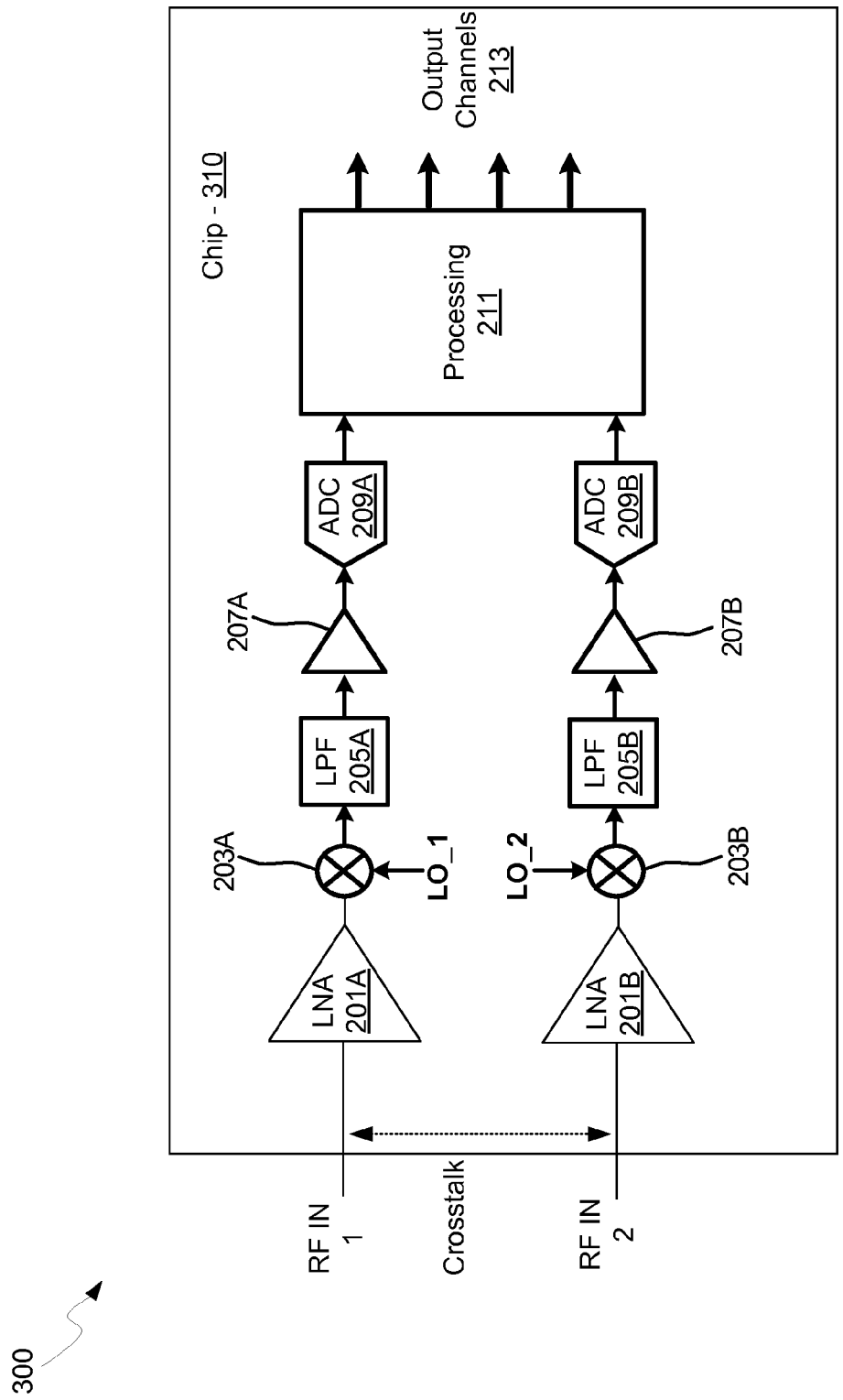
FIG. 3 is a diagram illustrating an exemplary receiver with crosstalk calibration and compensation, in accordance with an embodiment of the invention.

FIG. 3 is a diagram illustrating an exemplary receiver with crosstalk calibration and compensation, in accordance with an embodiment of the invention. Referring to FIG. 3, there is shown a receiver 300 comprising separate RF paths on a chip 310. The LNAs 201A and 201B, the mixers 203A and 203B, the LPFs 205A and 205B, the gain stages 207A and 207B, the ADCs 209A and 209B, and the processing module 211 may be as described with respect to FIG. 2. There is also shown input RF signals RF IN 1 and RF IN 2 and output channels 213.

In an exemplary scenario, high frequency RF signals may couple between RF paths on a chip, as shown by the dashed line in FIG. 3. This crosstalk reduces the signal to noise ratio of the receiver. To calibrate and compensate for signal crosstalk, the process may approximate the frequency dependency of the crosstalk over a channel bandwidth as linear. As such, the crosstalk may be represented as a sum of an average term and a linearly varying term, which make the calibration process more tractable and leads to a more efficient implementation.

In an example scenario, the calibration process may be based on blind source separation (BSS) algorithms to estimate the crosstalk over a certain bandwidth, although any signal de-correlation algorithm may be used. The BSS method estimates the complex coupling coefficients between the two signals and the coupling coefficients may then be reduced in an iterative process in the digital domain in the processing module 211.

Figure 4:
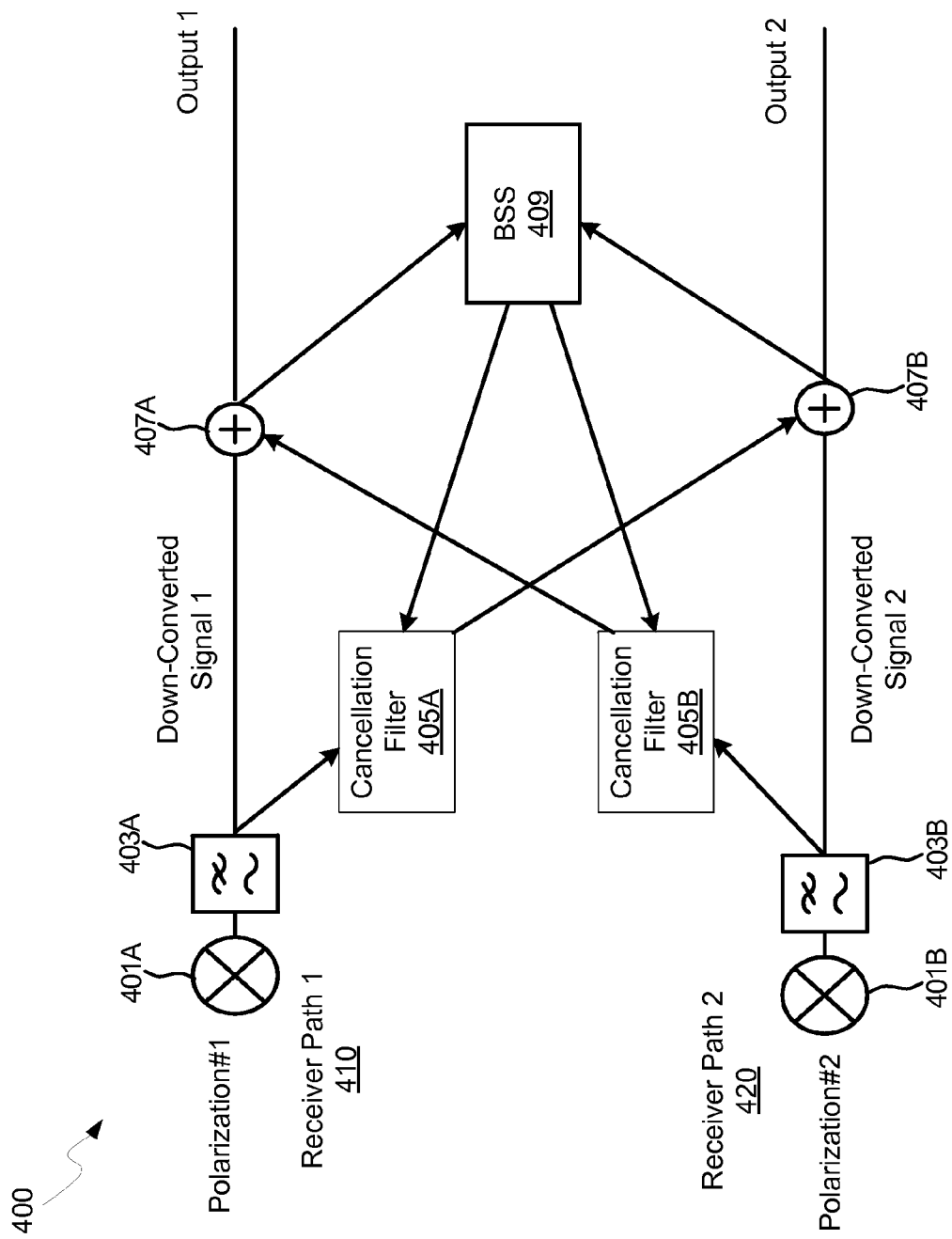
FIG. 4 is a diagram illustrating exemplary crosstalk calibration and compensation circuitry, in accordance with an embodiment of the invention.

FIG. 4 is a diagram illustrating exemplary crosstalk calibration and compensation circuitry, in accordance with an embodiment of the invention. Referring to FIG. 4, there is shown a receiver 400 with crosstalk calibration and compensation comprising receiver paths 410 and 420, which respectively comprise mixers 401A and 401B, low-pass filters 403A and 403B, cancellation filters 405A and 405B, summers 407A and 407B, and a BSS module 409. There is also shown input signals, polarization #1 and polarization #2, down-converted signals 1 and 2, and output signals, output 1 and output 2. The components in FIG. 4 may operate exclusively in the digital domain, or partially in the analog domain and partially in the digital domain.

The mixers 401A and 401B may be operable to down-convert received RF signals to baseband frequencies, and as such may be substantially similar to the mixers 203A and 203B. The received RF signals may comprise crosstalk from the other signal, such that polarization #1 comprises a small component of polarization #2, and vice versa. The low-pass filters 403A and 403B may be operable to filter out signals at a frequency above a corner frequency and allow lower frequency signals to pass to the summers 407A and 407B and the cancellation filters 405A and 405B.

The summers 407A and 407B may comprise circuitry that is operable to add a plurality of input signals and output a combined output signal. In this manner, an appropriate input signal may be injected to cancel out unwanted signals.

The BSS module 409 may comprise circuitry, logic, and/or code that is operable to determine coupling coefficients between received signals, which may comprise one or more undesired crosstalk signals. Accordingly, once the complex coupling coefficients are determined, the BSS module 409 may be operable to control the cancellation filters 405A and 405B. which may generate output signals that may cancel crosstalk signals when added to the other input signal at the summer 407A or 407B. The BSS module 405 may also be operable to down-sample received digital channel signals.

In an example scenario, the input signal, polarization #1, may be down-converted by the mixer 401A and filtered by the low-pass filter 403A before being communicated to the summer 407A and cancellation filter 405. Similarly, the input signal, polarization #2, may be down-converted by the mixer 401B and filtered by the low pass filter 403B before being communicated to the summer 407B and the cancellation filter 405B. The cancellation filters 405A and 405B may be cross-coupled to communicate signal to the opposite signal path, such that crosstalk signals from one path may be eliminated in the other path.

The down-converted signal 1 may be summed with an output signal of the cancellation filter 405B, which receives the filtered and down-converted polarization #2 signal. The BSS module may receive the summed signals and calculate the complex coupling coefficients of the desired signal, the polarization #1 signal, and any crosstalk signal. The BSS module 409 may then communicate a control signal for the cancellation filter to configure the output signal from the cancellation filter 405B to be summed with the down-converted signal 2 at the summer 407A to eliminate the crosstalk signal from the output 1 signal. The BSS module 409 may perform the same control on the cancellation filter 405A such that crosstalk from the polarization #1 signal is eliminated from the output 2 signal.

Figure 5:
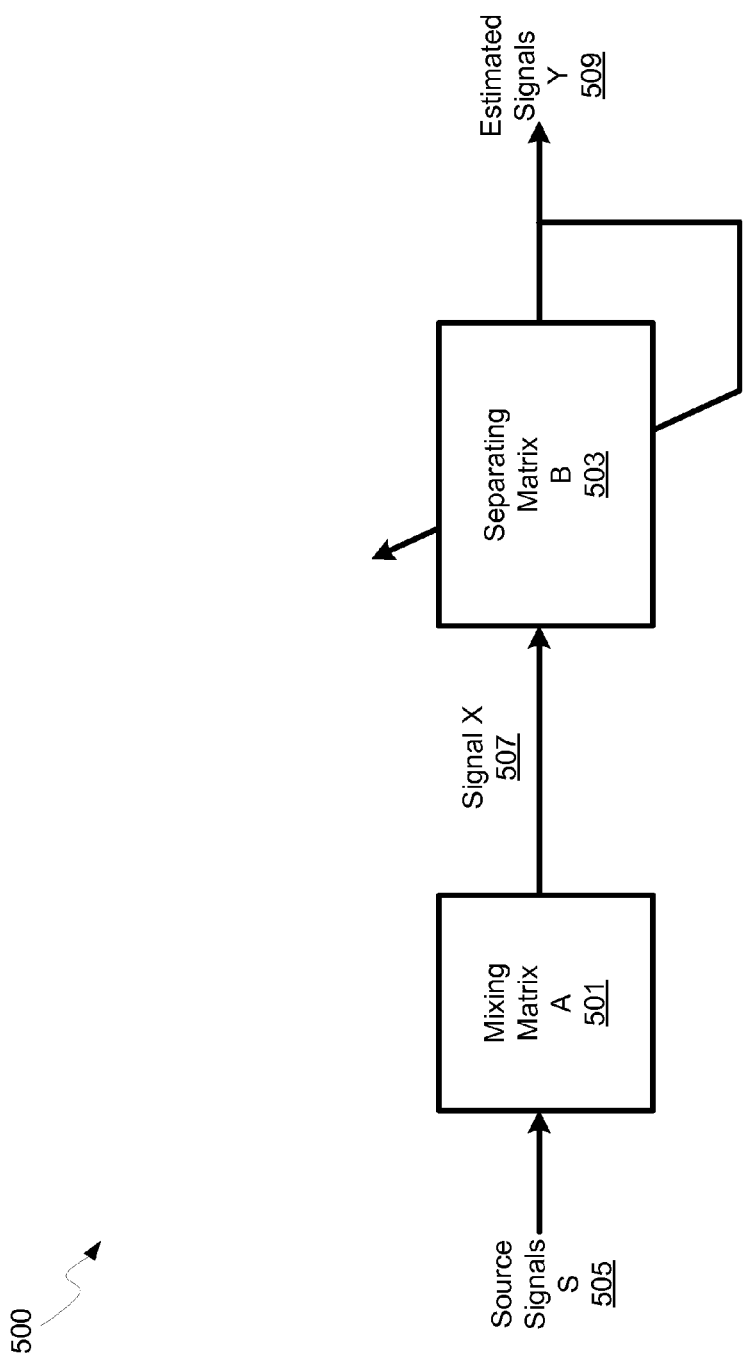
FIG. 5 is a diagram illustrating an exemplary blind source separation algorithm process, in accordance with an embodiment of the invention.

FIG. 5 is a diagram illustrating an exemplary blind source separation algorithm process, in accordance with an embodiment of the invention. Referring to FIG. 5, there is shown a BSS process 500 comprising a mixing matrix A 501 and a separating matrix B 503. The mixing matrix A represents the unwanted cross polarization coupling. There is also shown source signal S 505, signal X 507, and estimated signals Y 509.

Referring to FIG. 5, it is shown that the estimated signals y 509 may be described by $y_t = B_t * x_t$ where $B_t$ is the separating matrix B 503. The BSS algorithm predicts a subsequent separating matrix, $B_{t+1}$, as $B_t * H(y_t) * B_t$, where H(y) is defined by $H(y) = f(y) * g^H(y) - I$, with I being an identity matrix. Furthermore, $f_i(y_i) = y_i * |y_1|^2$, and $g_i(y_i) = \text{sign}(\text{Re}\{y_i\}) + j * \text{sign}(\text{Im}\{y_i\})$, where i is between 1 and 2, inclusive.

Utilizing the above relations, the BSS module 405 may determine average gain and phase levels for desired signals and undesired crosstalk signals and remove the averages, with the resulting signal communicated to circuitry for further processing and tilt estimation, as shown in FIG. 4.

In an embodiment of the invention, a method and system may comprise receiving radio frequency (RF) signals on a chip 310, the RF signals comprising a desired signal and at least one crosstalk signal, down-converting the received RF signals to baseband frequencies, converting the down-converted signals to digital signals, determining crosstalk by estimating complex coupling coefficients between the received RF signals utilizing a de-correlation algorithm across a frequency bandwidth comprising the desired and crosstalk signals, and extracting data communicated by the desired signal by minimizing the complex coupling coefficients. The de-correlation algorithm may comprise a blind source separation algorithm. The crosstalk may be approximated as linear within the frequency bandwidth. The crosstalk signal may comprise one or both of satellite polarization crosstalk and signal bleeding between RF paths in the chip. The down-converted signals may be low-pass filtered and summed with an output signal from a cancellation filter 405A/405B. The complex coupling coefficients may be determined utilizing the de-correlation algorithm on the summed signals and the cancellation filter may be configured utilizing the determined complex coupling coefficients. Crosstalk may be canceled in a first receiver path 410 on the chip from a cancellation filter 405B receiving low-pass filtered down-converted signals from a second receiver path 420 on the chip. Crosstalk may be canceled in the second receiver path 420 on the chip from a cancellation filter 405A receiving low-pass filtered down-converted signals from the first receiver path 410 on the chip Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for improved cross polarization rejection and tolerating coupling between satellite signals.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for wireless communication, the method comprising:
   receiving radio frequency (RF) signals on a chip, said RF signals comprising a desired signal and at least one crosstalk signal;
   down-converting the received RF signals to baseband frequencies;
   converting the down-converted signals to digital signals;
   determining crosstalk between channels in the received RF signals by calculating complex coupling coefficients between the received RF signals utilizing a de-correlation algorithm across a frequency bandwidth comprising said desired and crosstalk signals, wherein said crosstalk is approximated as linear within said frequency bandwidth for said calculating complex coupling coefficients and said crosstalk is represented as a sum of an average term and a linearly varying term; and
   extracting data communicated by said desired signal by utilizing said complex coupling coefficients to cancel the crosstalk between said channels in the received RF signals.

2. The method according to claim 1, wherein said at least one crosstalk signal comprises one or more of: satellite polarization crosstalk and signal bleeding between RF paths in said chip.

3. The method according to claim 1, comprising low-pass filtering the down-converted signals.

4. The method according to claim 3, comprising summing the low-pass filtered down-converted signals with an output signal from a cancellation filter.

5. The method according to claim 4, comprising determining said complex coupling coefficients utilizing said de-correlation algorithm on said summed signals.

6. The method according to claim 5, comprising configuring said cancellation filter utilizing said determined complex coupling coefficients.

7. The method according to claim 6, comprising cancelling crosstalk in a first receiver path on said chip by receiving a signal from a cancellation filter receiving low-pass filtered down-converted signals from a second receiver path on said chip.

8. The method according to claim 6, comprising cancelling crosstalk in said second receiver path on said chip by receiving a signal from a cancellation filter receiving low-pass filtered down-converted signals from said first receiver path on said chip.

9. A system for wireless communication, the system comprising:
one or more circuits on a chip comprising one or more RF paths, wherein said one or more circuits are operable to:
receive radio frequency (RF) signals comprising a desired signal and at least one crosstalk signal;
down-convert the received RF signals to baseband frequencies;
convert the down-converted signals to digital signals;
determine crosstalk between channels in the received RF signals by calculating complex coupling coefficients between the received RF signals utilizing a de-correlation algorithm across a frequency bandwidth comprising said desired and crosstalk signals, wherein said crosstalk is approximated as linear within said frequency bandwidth for said calculating complex coupling coefficients and said crosstalk is represented as a sum of an average term and a linearly varying term; and
extract data communicated by said desired signal by utilizing said complex coupling coefficients to cancel the crosstalk between said channels in the received RF signals.

10. The system according to claim 9, wherein said one or more circuits are operable to low-pass filter the down-converted signals.

11. The system according to claim 10, wherein said one or more circuits are operable to sum the low-pass filtered down-converted signals with an output signal from a cancellation filter.

12. The system according to claim 11, wherein said one or more circuits are operable to determine said complex coupling coefficients utilizing said de-correlation algorithm on said summed signals.

13. The system according to claim 12, wherein said one or more circuits are operable to configure said cancellation filter utilizing said determined complex coupling coefficients.

14. The system according to claim 13, wherein said one or more circuits are operable to cancel crosstalk in a first receiver path on said chip from a cancellation filter receiving low-pass filtered down-converted signals from a second receiver path on said chip.

15. The system according to claim 13, wherein said one or more circuits are operable to cancel crosstalk in said second receiver path on said chip from a cancellation filter receiving low-pass filtered down-converted signals from said first receiver path on said chip.

16. A method for wireless communication, the method comprising:
receiving radio frequency (RF) signals on a chip, said RF signals comprising a desired signal and at least one crosstalk signal;
down-converting the received RF signals to baseband frequencies;
converting the down-converted signals to digital signals;
determining crosstalk between channels in the received RF signals by calculating complex coupling coefficients between the received RF signals utilizing a de-correlation algorithm across a frequency bandwidth comprising said desired and crosstalk signals, said crosstalk being approximated as linear within said frequency bandwidth for said calculating complex coupling coefficients, wherein the de-correlation algorithm comprises a blind source separation algorithm and said crosstalk is represented as a sum of an average term and a linearly varying term; and
extracting data communicated by said desired signal by utilizing said complex coupling coefficients to cancel the crosstalk between said channels in the received RF signals.

17. The method according to claim 16, wherein said at least one crosstalk signal comprises one or more of: satellite polarization crosstalk and signal bleeding between RF paths in said chip.

18. The method according to claim 16, comprising low-pass filtering the down-converted signals.

19. The method according to claim 18, comprising summing the low-pass filtered down-converted signals with an output signal from a cancellation filter.

20. The method according to claim 19, comprising determining said complex coupling coefficients utilizing said de-correlation algorithm on said summed signals.

21. The method according to claim 20, comprising configuring said cancellation filter utilizing said determined complex coupling coefficients.

22. The method according to claim 21, comprising cancelling crosstalk in a first receiver path on said chip by receiving a signal from a cancellation filter receiving low-pass filtered down-converted signals from a second receiver path on said chip.

23. The method according to claim 21, comprising cancelling crosstalk in said second receiver path on said chip by receiving a signal from a cancellation filter receiving low-pass filtered down-converted signals from said first receiver path on said chip.

24. A system for wireless communication, the system comprising:
one or more circuits on a chip comprising one or more RF paths, wherein said one or more circuits are operable to:
receive radio frequency (RF) signals comprising a desired signal and at least one crosstalk signal;
down-convert the received RF signals to baseband frequencies;
convert the down-converted signals to digital signals;
determine crosstalk between channels in the received RF signals by calculating complex coupling coefficients between the received RF signals utilizing a de-correlation algorithm across a frequency bandwidth comprising said desired and crosstalk signals, said crosstalk being approximated as linear within said frequency bandwidth for said calculating complex coupling coefficients and said crosstalk being represented as a sum of an average term and a linearly varying term, wherein the de-correlation algorithm comprises a blind source separation algorithm; and extract data communicated by said desired signal by utilizing said complex coupling coefficients to cancel the crosstalk between said channels in the received RF signals.

25. The system according to claim 24, wherein said one or more circuits are operable to low-pass filter the down-converted signals.

26. The system according to claim 25, wherein said one or more circuits are operable to sum the low-pass filtered down-converted signals with an output signal from a cancellation filter.

27. The system according to claim 26, wherein said one or more circuits are operable to determine said complex coupling coefficients utilizing said de-correlation algorithm on said summed signals.

28. The system according to claim 27, wherein said one or more circuits are operable to configure said cancellation filter utilizing said determined complex coupling coefficients.

29. The system according to claim 28, wherein said one or more circuits are operable to cancel crosstalk in a first receiver path on said chip from a cancellation filter receiving low-pass filtered down-converted signals from a second receiver path on said chip.

30. The system according to claim 28, wherein said one or more circuits are operable to cancel crosstalk in said second receiver path on said chip from a cancellation filter receiving low-pass filtered down-converted signals from said first receiver path on said chip.

* * * * *